United States Patent [19]

Goscenski, Jr.

[11] Patent Number: 4,873,882
[45] Date of Patent: Oct. 17, 1989

[54] MANUAL TRANSMISSION AND GEAR RATTLE DAMPER THEREFOR

[75] Inventor: Edward J. Goscenski, Jr., Battle Creek, Mich.

[73] Assignee: Eaton Corporation, Cleveland, Ohio

[21] Appl. No.: 250,208

[22] Filed: Sep. 28, 1988

[51] Int. Cl.$^4$ ............................................. F16H 57/00
[52] U.S. Cl. ........................................ 74/411; 74/375; 464/160
[58] Field of Search ................... 74/411; 464/24, 37, 464/160, 162, 180

[56] References Cited

U.S. PATENT DOCUMENTS

| | | | |
|---|---|---|---|
| Re. 31,154 | 2/1983 | Hammond et al. | 74/411 |
| 1,359,848 | 11/1920 | Techel | 464/24 X |
| 2,812,648 | 11/1957 | Croset | 464/24 |
| 3,263,450 | 8/1966 | Condon | 464/24 |
| 3,364,768 | 1/1968 | Powell | 74/339 |
| 3,398,594 | 8/1968 | Keller | 74/333 |
| 3,408,830 | 11/1968 | Sutaruk et al. | 74/411 |
| 4,277,956 | 7/1981 | Lane | 464/24 |
| 4,677,868 | 7/1987 | Filkins | 74/359 |
| 4,712,663 | 12/1987 | Teraoka | 464/162 X |
| 4,772,245 | 9/1988 | Readman et al. | 464/160 X |

FOREIGN PATENT DOCUMENTS 0130883 1/1985 European Pat. Off. ............ 464/180

Primary Examiner—Leslie A. Braun
Assistant Examiner—Janice E. Chartoff
Attorney, Agent, or Firm—L. J. Kasper

[57] ABSTRACT

A manual transmission (11) is provided of the type including an input shaft (15) including an input gear (19), an output shaft (23), and a countershaft including a head gear (44). The countershaft includes drive gears (41, 42, and 43) while the output shaft has rotatably mounted thereon a plurality of driven gears (31, 32, and 33) in toothed engagement with the drive gears. The head gear defines a set of internal splines (55), and the countershaft defines a set of external splines (57) which are in loose, splined engagement to define a lost motion connection. The head gear defines a pair of cam surfaces (59), and the countershaft includes a pair of cam members (61) and a compression spring (63), operable to bias the cam members against the cam surfaces, and bias the countershaft toward a centered position, relative to the head gear. The head gear and countershaft define a viscous damper portion (65) disposed separately from the lost motion means, including a viscous shear space (69), which is operable when filled with viscous fluid to dampen relative rotation between the countershaft and the head gear.

9 Claims, 4 Drawing Sheets

MANUAL TRANSMISSION AND GEAR RATTLE DAMPER THEREFOR

BACKGROUND OF THE DISCLOSURE

The present invention relates to manual transmissions for vehicles, and more specifically, to a manual transmission of the type including a countershaft which, under relatively light torques, is able to oscillate due to engine torque pulses transmitted by the input shaft.

Oscillation of the countershaft, under light torque and light acceleration conditions, is considered undesirable because of the possibility of "gear rattle", which can occur between any pair of meshed gears on the countershaft and output shaft through which no substantial amount of torque is being transmitted.

The prior art has attempted to dampen such oscillations of the countershaft, and thereby eliminate gear rattle. U.S. Pat. No. 4,677,868 discloses a manual transmission of the countershaft type in which the head gear and the countershaft are not formed integrally, but instead, the head gear is separate from the countershaft, but includes a set of splines which is in loose splined engagement with a second set of splines, such that the head gear is able to transmit torque to the countershaft through the loose spline connection. In the cited patent, the loose spline connection permits about one degree of relative rotation between the adjacent splines. The spline area is filled with viscous fluid, for the stated purpose of dampening torsional oscillations between the head gear and the countershaft.

In the device of the '868 patent, however, when torque is transmitted to the head gear, under light torque and acceleration conditions, the splines associated with the head gear will engage the adjacent splines associated with the countershaft, with the only dampening being that which occurs as the fluid is pumped from between adjacent splines, as those splines move into engagement. However, with only about one degree of relative rotation possible in the splines, very little dampening can occur.

SUMMARY OF THE INVENTION

Accordingly, it is an object of the present invention to provide an improved manual transmission of the countershaft type, with substantially improved capability for dampening relative oscillations between the head gear and countershaft, to prevent incipient gear rattle.

A more specific object of the present invention is to provide an improved dampening mechanism which is less expensive, and in which the dampening torque is less sensitive to manufacturing tolerances.

The above and other objects of the present invention are accomplished by the provision of a manual transmission of the type including housing means, an input shaft rotatably supported relative to the housing means and adapted to receive input drive torque from a source of motive power, the input shaft defining an axis of rotation. An output shaft is rotatably supported relative to the housing and is generally parallel to the input shaft. A countershaft is rotatably supported relative to the housing and has an axis of rotation generally parallel to the axes of the input and output shafts. An input gear has a set of peripheral gear teeth and is fixed to rotate with the input shaft. A head gear has a set of peripheral gear teeth in engagement with the gear teeth of the input gear and is fixed to rotate with the countershaft, and to transmit input drive torque thereto from the input shaft. A first drive gear has a set of peripheral gear teeth and is fixed to receive input drive torque from the countershaft and a first driven gear has a set of peripheral gear teeth in engagement with the gear teeth of the first drive gear. The transmission includes means shiftable between a first position in which the first driven gear is operable to transmit drive torque from the first drive gear to the output shaft, and a second position in which the first driven gear is operable to freewheel relative to the output shaft. The transmission further includes means for dampening the transmission of torsional oscillations or vibrations from the head gear to the countershaft.

The transmission is characterized by the countershaft and the head gear cooperating to define a lost motion means operable to limit the rotation of the head gear relative to the countershaft. The dampening means includes means biasing the countershaft toward a centered position relative to the head gear, wherein the countershaft is disposed between its rotational limits, relative to the head gear. The head gear and the countershaft cooperate to define a viscous damper portion disposed separately from the lost motion means, the viscous damper portion being operable when filled with viscous fluid to dampen relative rotation between the countershaft and the head gear.

DESCRIPTION OF THE PREFERRED EMBODIMENT

Figure 1:
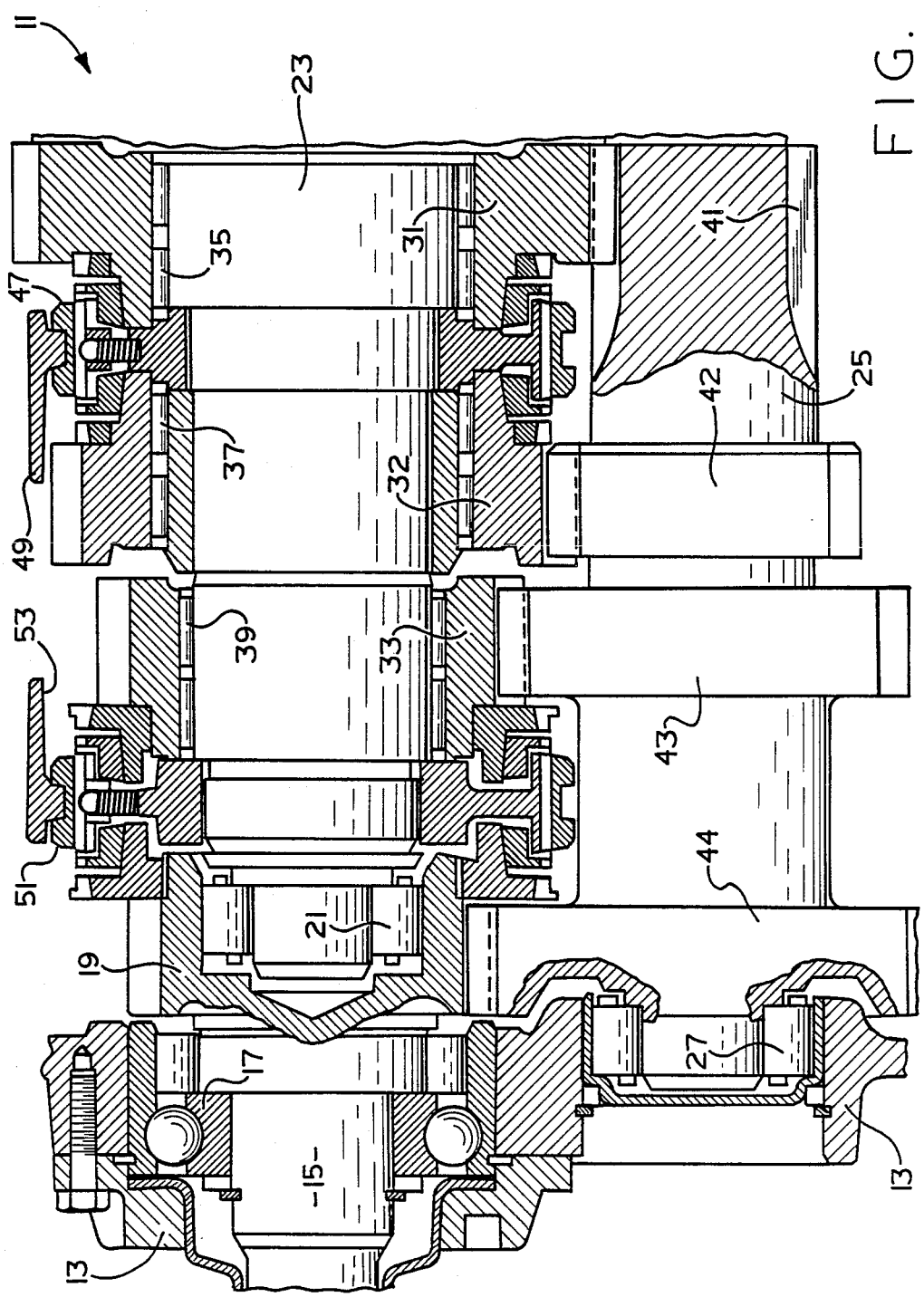
FIG. 1 is an axial view, partly in cross section and partly in plan view, showing a manual transmission of the type to which the present invention is applicable.

Referring now to the drawings, which are not intended to limit the invention, FIG. 1 is an axial view of a vehicle manual transmission generally designated 11. The transmission 11 includes several housing sections, all generally designated 13, the forward portion of which (left end in FIG. 1) receives an input shaft 15 which is rotatably supported relative to the housing 13 by means of a bearing set 17. The transmission input shaft 15 receives input drive torque from the vehicle engine crankshaft (not shown) in a manner well known to those skilled in the art.

Formed integrally with the input shaft 15 is an input gear 19, which is somewhat hollow, and has disposed therein a bearing set 21. Received within the bearing set 21, and rotatably supported thereby, is the forward end of the transmission output shaft 23, the rearward end of which is rotatably supported by the housing 13 within a set of bearings (not shown). In the subject embodiment, the input shaft 15 and the output shaft 23 are coaxial, although that is not an essential feature of the present invention.

Also disposed within the housing 13 is a transmission countershaft 25, having its axis of rotation parallel to the axes of input shaft 15 and output shaft 23. The forward end of the countershaft 25 is rotatably supported within the housing 13 by means of a bearing set 27, while the rearward end of the countershaft 25 is similarly supported (not shown).

Referring still to FIG. 1, rotatably disposed on the output shaft 23 is a first speed driven gear 31, a second speed driven gear 32 and a third speed driven gear 33. Each of the driven gears 31, 32 and 33 is mounted to be freely rotatable relative to the output shaft 23 by means of suitable sets of needle bearings 35, 37 and 39, respectively.

The countershaft 25 includes a first speed drive gear 41, a second speed drive gear 42, and a third speed drive gear 43. As is shown in FIG. 1, the drive gears 41, 42 and 43 are in toothed engagement with, and operable to drive, the driven gears 31, 32, and 33. Preferably, the drive gears 41, 42 and 43 are formed integrally with the countershaft 25.

Disposed toward the forward end of the countershaft 25 is a driven gear 44, which is more typically referred to as the "head gear". In typical prior art manual transmissions of the type shown in FIG. 1, the head gear 44 would also be formed integrally with the countershaft 25, although it is now known from U.S. Pat. No. 4,677,868 for the head gear 44 to be separated from the countershaft 25, and to have the ability to rotate relative thereto by a small amount.

Surrounding the output shaft 23, and disposed axially between the first and second speed driven gears 31 and 32 is a first and second speed synchronizer mechanism 47, adapted to be operated by a shift fork 49. Similarly, surrounding the output shaft 23, and axially disposed between the third speed driven gear 33 and the input gear 19 is a third and fourth speed synchronizer mechanism 51, adapted to be operated by a shift fork 53. As is well known to those skilled in the art, if the shift fork 49 is moved to a position which is operable to select first speed operation of the transmission, the synchronizer mechanism 47 is moved into frictional engagement with an adjacent frictional surface of the first speed driven gear 31. When there is synchronization of the speeds of the output shaft 23 and the driven gear 31, a splined coupling connects the synchronizer mechanism 47 (and thus, also the output shaft 23) to the driven gear 31. Because the synchronizer mechanism 47 is in splined engagement with the output shaft 23, such actuation of the mechanism 47 results in the first speed driven gear 31 being fixed to drive the output shaft 23. Therefore, when first speed operation has been selected by appropriate positioning of the shift fork 49, input torque is transmitted from the input shaft 15 through the input gear 19 to the head gear 44 which, in turn, transmits torque through the countershaft 25 and the first speed drive gear 41 to the first speed driven gear 31, and then to the output shaft 23 as described above.

Similarly, if the shift fork 49 is positioned to select second speed operation of the transmission, then the synchronizer mechanism 47 is moved to the left in FIG. 1, to engage the second speed driven gear 32, and torque is transmitted as described above, except that torque is then transmitted from the countershaft 25 and the second speed driven gear 32 to the output shaft 23. Positioning of the shift fork 53 to move the third and fourth speed synchronizer mechanism 51 to engage either the third speed driven gear 33 or the input gear 19 will result in operation of the transmission in either third speed or fourth speed, respectively. As will be apparent to those skilled in the art, having the synchronizer mechanism 51 engage the input gear 19 for fourth speed operation results in a 1:1 relationship between the input shaft 15 and the output shaft 23.

Referring again to second speed operation, by way of example only, torque is being positively transmitted from the countershaft 25 through the peripheral teeth on the second speed drive gear 42 to the peripheral teeth on the second speed driven gear 32, to transmit input torque to the output shaft 23. While torque is being transmitted as described above, the first speed drive gear 41 remains in toothed engagement with the first speed driven gear 31, while the third speed drive gear 43 remains in toothed engagement with the third speed driven gear 33. However, the only torque being transmitted from those drive gears to their respective driven gears is that required to overcome the friction of the needle bearings 35 and 39. Therefore, variations or oscillations in the speed of rotation of the input shaft 15 are transmitted to the countershaft 25 and to the first and third speed drive gears 41 and 43. If these oscillations are substantial (e.g., ±10 rpm.), each tooth on the drive gears 41 and 43 will tend to come out of contact with the adjacent tooth which it is driving on the driven gear 31 and 33, respectively. The result of such periodic loss of, or tendency to lose, tooth contact is incipient gear rattle, i.e., a tooth on a drive gear comes out of engagement with the adjacent tooth on the driven gear and engages an adjacent, trailing tooth on the driven gear. Because of the very light torques being transmitted through these "non-driving" drive and driven gears, such oscillations in the speed of rotation of the input shaft can be transmitted into an oscillatory type movement of the driven gears which are then freewheeling, and the resulting bouncing or rattling of the "non-driving" drive and driven gears causes a very undesirable noise within the transmission which is typically audible to the vehicle operator.

Figure 2:
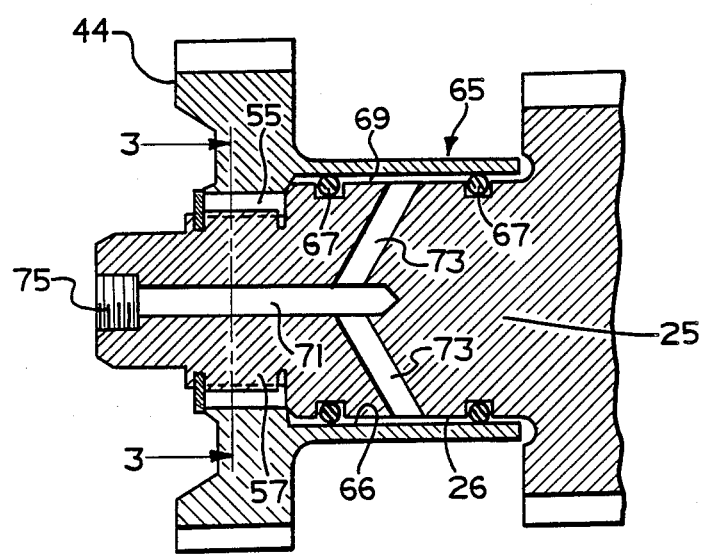
FIG. 2 is a fragmentary view, similar to FIG. 1, illustrating the viscous damper portion according to the present invention.
Figure 3:
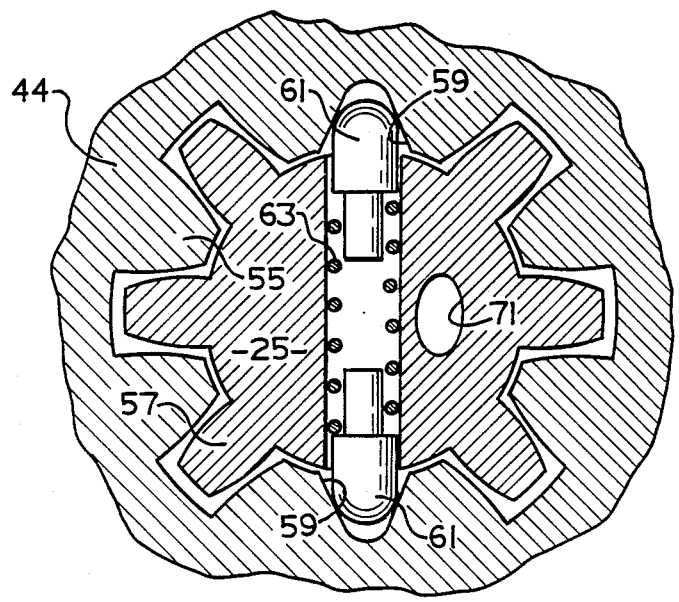
FIG. 3 is a transverse cross-section taken on line 3—3 of FIG. 2, but on a larger scale, illustrating the lost motion means associated with the viscous damper portion.

FIGS 2 and 3

Referring now to FIG. 2, there is illustrated an axial cross-section through the countershaft 25 and head gear 44, illustrating a damper portion made in accordance with the present invention. As was mentioned previously, it has been typical in prior art transmissions for the head gear 44 to be integral with the countershaft 25, as are the other drive gears 41, 42 and 43. However, in accordance with one aspect of the present invention, the head gear 44 is formed separately from the countershaft 25 but is "fixed" to the countershaft 25 by some form of lost motion means which is operable to permit a certain predetermined amount of relative rotation between the head gear 44 and the countershaft 25, but at the same time, is operable to transmit the full input torque from the head gear 44 to the countershaft 25. In the subject embodiment, the head gear 44 defines a set of internal splines 55, and in engagement therewith, the countershaft 25 defines a set of external splines 57, the splines 55 and 57 being sized relative to each other to provide for a predetermined amount of lost motion. In the subject embodiment, the head gear 44 is able to rotate about 5 degrees relative to the countershaft 25.

Referring now primarily to FIG. 3, it may be seen that at two diametrically-disposed locations, the splines are replaced by a centering mechanism. At each such location, the head gear 44 defines a pair of angled cam surfaces 59, and in engagement with each of the cam surfaces 59 is a cam member 61. Each cam member 61 is biased toward its radially outermost position by a helical compression spring 63. It will be understood by those skilled in the art that the interaction of the cam surface 59 and the member 61 and spring 63 will serve the same general function as a pair of torsional springs, tending to keep the head gear 44 centered relative to the countershaft 25, i.e., each spline 55 is centered between the adjacent pair of splines 57. The purpose of this biasing and centering function, as it relates to the damper mechanism of the present invention, will be described subsequently. It should be understood that as used herein, the term "centering" means merely that each of the splines 57 is out of engagement with each of the adjacent splines 59, but does not necessarily mean that each spline 57 is evenly spaced between the adjacent splines 59.

Referring again primarily to FIG. 2, the head gear 44 includes a generally annular or cylindrical damper portion 65 extending to the right of the head gear 44, is preferably formed integrally therewith, and defines a generally cylindrical inner surface 66. The cylindrical damper portion 65 is disposed to surround a portion of the countershaft 25, between the head gear 44 and the third speed drive gear 43, which defines a generally cylindrical outer surface 26. The countershaft 25 defines a pair of annular grooves in which are disposed a pair of seals 67. The outer cylindrical surface of the countershaft 25, between the seals 67, cooperates with the inner cylindrical surface of the damper portion 66 to define a viscous shear space 69. When the shear space 69 is filled with a suitable viscous fluid, such as a silicone oil, shearing of the viscous fluid in the shear space 69 dampens oscillations or variations in the speed of the countershaft 25.

Referring again primarily to FIG. 2, the countershaft 25 defines an axial bore 71, which is in open communication with a pair of angled bores 73. The purpose of the bores 71 and 73 is to permit filling of the shear space 69 with viscous fluid prior to assembly of the transmission. After the shear space, and at least part of the angled bores 73, has been filled with viscous fluid, a plug member 75 is threaded into the end of the axial bore 71, to retain the viscous fluid therein.

When input torque is transmitted from the input shaft 15 through the input gear 19 to the head gear 44, the normal oscillations in the speed of rotation of the input shaft are transmitted to the head gear 44. The arrangement of cam members 61 and springs 63 continually tends to bias the countershaft 25 toward a predetermined position, such as the centered position shown in FIG. 3. However, the oscillations in the speed of rotation of the head gear 44 also tend to be transmitted to the countershaft 25 and can even be increased in amplitude by the cam and spring arrangement of FIG. 3 (i.e., could be increased in the abscence of any damping). It has been found that the viscous damping provided by the viscous fluid in the shear space 69 is effective to dampen the variations in the speed of rotation of the countershaft 25 to be substantially less than the variations in the speed of rotation of the head gear 44.

As was mentioned previously, the gear rattle problem occurs only when a relatively small amount of torque is being transmitted through the head gear to the countershaft. Therefore, in selecting the spring 63, it is necessary to know the approximate, maximum torque level at which incipient gear rattle occurs, for that particular transmission design. With this "maximum" torque level known, the spring 63 should be selected to satisfy the following two criteria:

(1) At torque levels below the "maximum", the spring 63 should permit relative movement of the head gear 44 and countershaft 25, but should have sufficient biasing force such that the relative motion does not result in engagement of the splines 55 and 57; and (2) At torque levels above the "maximum", the spring 63 should permit enough relative motion such that the splines 55 engage the splines 57 and the head gear 44 drives the countershaft 25.

FIG. 4

In order to illustrate the effect of the present invention in damping variations in speed of the countershaft 25, and eliminating gear rattle, a computerized mathematical simulation was performed. For purposes of the simulation, it was assumed that the viscous shear space 69 was filled with viscous fluid having a viscosity of 30,000 centistokes, at a temperature of 300° F. It was further assumed that the input shaft 15 was rotating at a speed of 700 rpm., ±16 rpm., which is believed by the assignee of the present invention to be typical in situations of relatively low torque and light acceleration.

Figure 4:
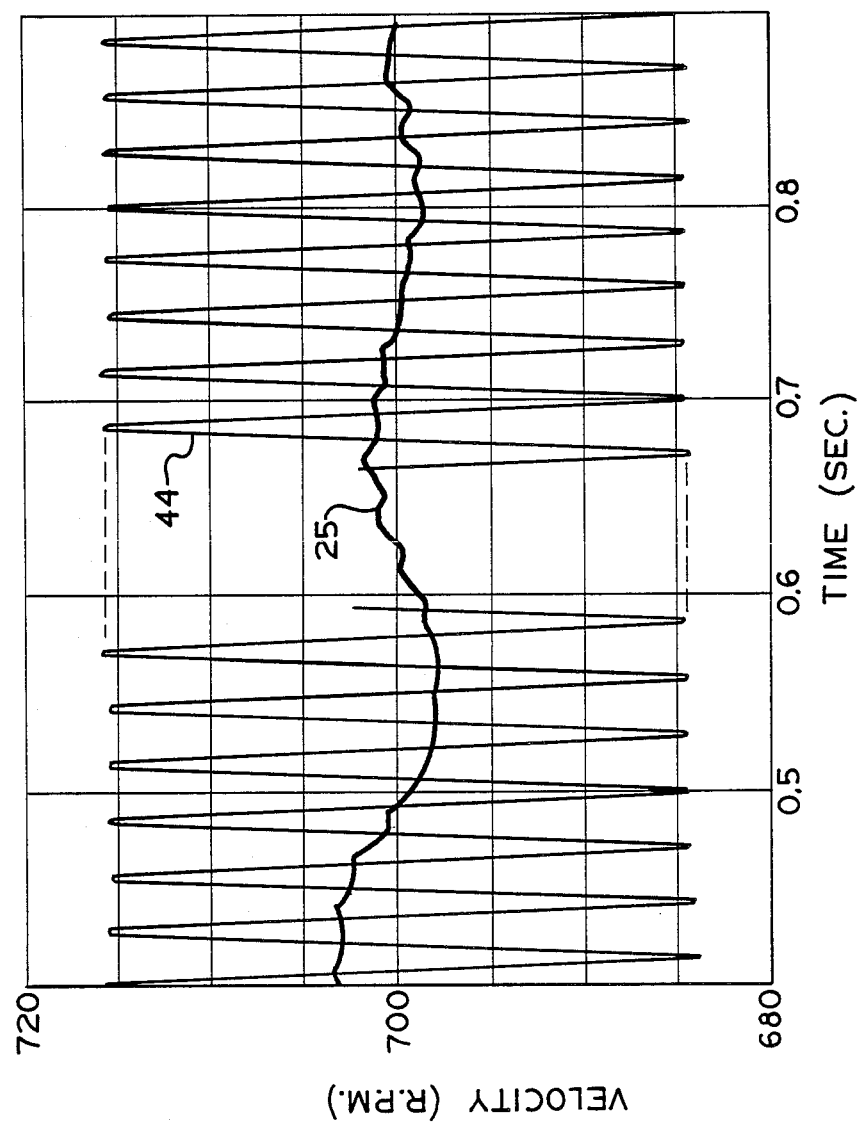
FIG. 4 is a graph of rotational velocity in rpm., as a function of time, for the head gear and countershaft, utilizing the present invention.

Referring now to the graph of FIG. 4, there is illustrated a graph of speed of rotation in rpm. versus time, and in the case of the simulation described above, each graph represents the oscillations about the mean speed of 700 rpm. The graph labeled "44" illustrates the variations in the speed of rotation of the head gear 44, which are transmitted, without substantial change other than due to gear ratio, from input shaft 15. As mentioned previously, these variations were assumed to be ±16 rpm. The other graph is labeled "25" and represents the variations in the speed of rotation of the countershaft 25, downstream of the damper portion of the present invention. The mathematical simulation of the present invention determined that the variations in the speed of rotation of the countershaft would be approximately ±2 rpm., which is approximately one eighth of the variations in the input speed.

FIG. 5

Figure 5:
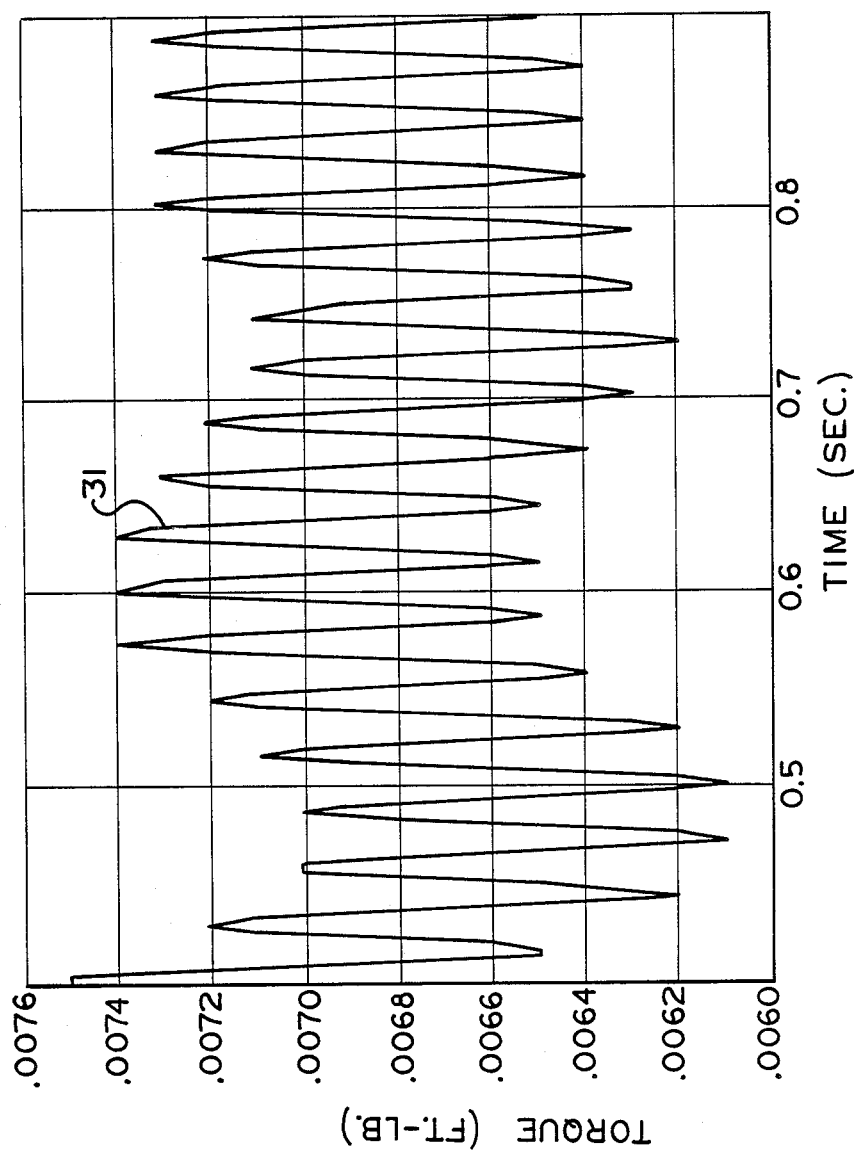
FIG. 5 is a graph of rotational torque in ft.-lb., as a function of time, for one of the driven gears, while it is in a disengaged mode.

Referring now to FIG. 5, there is illustrated a graph of torque in ft.-lb., as a function of time, and the graph is labeled "31", because the graph represents the torque transmitted from the countershaft 25 to the first speed driven gear 31. Inherently, the torque curve in FIG. 5 varies about a mean torque value (in the subject embodiment, 0.0068 ft.-lbs.) which represents the torque to overcome bearing friction, i.e., the friction in the needle bearings 35. With the damping provided by the damper portion of the present invention, the mathematical simulation verified, as shown in FIG. 5 that the first speed drive gear 41 would maintain a small but fairly constant and positive torque on the first speed driven gear 31. As may be seen in FIG. 5, the mathematical simulation indicates that the torque on the first speed driven gear 31 never drops below approximately 0.0061 ft.-lbs., which typically would be sufficient to avoid gear rattle. This is important because, as described previously, if the torque transmitted to any one of the "non-driving" driven gears approaches zero, the result will be incipient gear rattle. Therefore, it is an important aspect of the present invention that the substantial reduction in the variation in the rotational speed of the countershaft 25 will greatly minimize the variations in torque transmitted to the "non-driving" driven gear 31, thus keeping a minimum torque value far enough above zero to avoid gear rattle.

It is another important aspect of the present invention that the damping of the oscillations be accomplished by true viscous shear, rather than by forcing fluid through a dashpot or displacing fluid from between adjacent splines as in U.S. Pat. No. 4,677,868. In the case of either dashpot damping or "pumping" fluid between adjacent splines, it is critical to maintain tolerances very precisely, i.e., slight changes in certain dimensions can result in a substantial change in damping torque. When true viscous shear damping is in accordance with the present invention, it is relatively simple and inexpensive to maintain the necessary tolerances on the surfaces which define the viscous shear space 69.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

I claim:

1. A manual transmission of the type including housing means, an input shaft rotatably supported relative to said housing means and adapted to receive input drive torque from a source of motive power, and defining an axis of rotation; an output shaft rotatably supported relative to said housing means and defining an axis of rotation generally parallel to said input shaft; a countershaft rotatably supported relative to said housing means and having an axis of rotation generally parallel to said axes of said input and output shafts; a head gear being fixed to rotate with said countershaft, and to transmit input drive torque thereto from said input shaft; a first drive gear having a set of peripheral gear teeth and being fixed to receive input drive torque from said countershaft; a first driven gear having a set of peripheral gear teeth in engagement with said gear teeth of said first drive gear; means shiftable between a first position in which said first driven gear is operable to transmit drive torque from said first drive gear to said output shaft, and a second position in which said first driven gear is operable to free-wheel relative to said output shaft; and means for dampening the transmission of torsional vibrations from said head gear to said countershaft, characterized by:
  (a) said countershaft and said head gear cooperating to define lost motion means operable to limit the rotation of said head gear relative to said countershaft;
  (b) means biasing said countershaft toward a centered position relative to said head gear, wherein said countershaft is disposed between its rotational limits, relative to said head gear; and
  (c) said head gear and said countershaft cooperating to define a viscous damper portion, disposed separately from said lost motion means, said viscous damper portion being operable when filled with viscous fluid, to dampen relative rotation between said countershaft and said head gear.

2. A manual transmission as claimed in claim 1 characterized by said lost motion means comprising said head gear defining a set of internal splines and said countershaft defining a set of external splines in relatively loose splined engagement with said internal splines.

3. A manual transmission as claimed in claim 2 characterized by said internal splines and said external splines being configured to provide approximately five degrees of rotational lost motion between said head gear and said countershaft.

4. A manual transmission as claimed in claim 1 characterized by said biasing means comprising one of said head gear and said countershaft defining a cam surface, said biasing means further comprising a cam member and means biasing said cam member into engagement with said cam surface.

5. A manual transmission as claimed in claim 4 characterized by said biasing means providing sufficient biasing force to maintain said head gear and said countershaft between said rotational limits when said input drive torque being transmitted from said head gear to said countershaft is low enough to permit incipient gear rattle to occur.

6. A manual transmission as claimed in claim 4 characterized by said biasing means being selected to permit rotational movement of said countershaft relative to said head gear, said rotational movement comprising substantially all of the available movement between said rotational limits.

7. A manual transmission as claimed in claim 1 characterized by said viscous damper portion comprising said countershaft defining a generally cylindrical outer surface and said head gear including a generally cylindrical inner surface, said outer surface and said inner surface cooperating to define a viscous shear space.

8. A manual transmission as claimed in claim 7 characterized by said countershaft defining passage means providing communication from the the outside of said countershaft to said viscous shear space, whereby said passage means is operable to provide viscous fluid reservoir means for said viscous shear space.

9. A manual transmission of the type including housing means, an input shaft rotatably supported relative to said housing means and adapted to receive input drive torque from a source of motive power, and defining an axis of rotation; an output shaft rotatably supported relative to said housing means and defining an axis of rotation generally parallel to said input shaft; a countershaft rotatably supported relative to said housing means and having an axis of rotation generally parallel to said axes of said input and output shafts; an input gear having a set of peripheral gear teeth and being fixed to rotate with said input shaft; a head gear having a set of peripheral gear teeth in engagement with said gear teeth of said input gear, and being fixed to rotate with said countershaft, and to transmit input drive torque thereto from said input shaft; a first drive gear having a set of peripheral gear teeth and being fixed to receive input device torque from said countershaft; a first driven gear having a set of peripheral gear teeth in engagement with said gear teeth of said first drive gear; means shiftable between a first position in which said first driven gear is operable to transmit drive torque from said first drive gear to said output shaft, and a second position in which said first driven gear is operable to free-wheel relative to said output shaft; and means for dampening the transmission of torsional vibrations from said head gear to said countershaft, characterized by:

(a) said countershaft defining a set of external splines, and said head gear defining a set of internal splines in loose splined engagement with said set of external splines;

(b) means biasing said countershaft toward a centered position relative to said head gear, wherein each of said external splines on said countershaft is approximately centered between the two adjacent internal splines on said head gear; and (c) said head gear having a generally annular damper portion fixed for rotation with sadi head gear, said damper portion being disposed in surrounding relationship relative to at least a portion of said countershaft, axially disposed from said external splines, to define a viscous shear space between said countershaft and said damper portion.

* * * * *